Patented Dec. 15, 1931

1,836,170

UNITED STATES PATENT OFFICE

ERNST M. JOHANSEN, OF FALL RIVER, MASSACHUSETTS, ASSIGNOR TO THE GRAY PROCESSES CORPORATION, OF NEWARK, NEW JERSEY, A CORPORATION OF DELAWARE

PROCESS OF PRODUCING SULPHUR COMPOUNDS

No Drawing.    Application filed June 22, 1926.    Serial No. 117,866.

This invention relates to a process of producing sulphur compounds.

One object of the invention is to provide a novel process for producing sulphur compounds from unsaturated hydrocarbons.

A further object of the invention is to provide a novel process for producing sulphur compounds having the characteristic properties of mercaptans, and more particularly a process for the production of such sulphur compounds from unsaturated hydrocarbons contained in or derived from petroleum or natural gas.

In accordance with the preferred process unsaturated hyrocarbons, preferably contained in a hydrocarbon fraction from petroleum, are caused to react with hydrogen sulphide at ordinary temperature, preferably by introducing the hydrogen sulphide into the hydrocarbon fraction, following this by treatment with a reagent such as sulphuric acid or an adsorbent such as fuller's earth, whereby sulphur compounds are formed having properties characteristic of the mercaptans. In the preferred process the introduction of the hydrogen sulphide is preferably continued for some period of tme, and then the resulting solution agitated with sulphuric acid, preferably of 50-93%, until the odor of the hydrogen sulphide has disappeared. The hydrocarbons are again saturated with hydrogen sulphide and subsequently agitated with sulphuric acid and the treatment repeated preferably until no more reaction takes place. The sulphuric acid is then allowed to settle and is withdrawn from the resulting solution and then any free acid present is neutralized with a solution of alkali, preferably with a 10% solution of sodium hydroxide. Thereafter the solution is washed with water to remove the free alkali. The resulting solution is then subjected to distillation and redistillation to eliminate any non-volatile substances present, and the distillate comprises a solution of the sulphur compounds, which I have found to possess characteristic mercaptan reactions.

The nature of the reaction between the unsaturated hydrocarbons and the hydrogen sulphide is believed to be a direct addition of the hydrogen sulphide and may be illustrated by the formation of ethyl mercaptan from ethylene and hydrogen sulphide according to the following equation and in which ethylene may be regarded as typical of any of the unsaturated hydrocarbons:

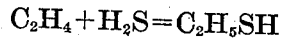

$$C_2H_4 + H_2S = C_2H_5SH$$

I have found that the sulphur compounds of the character of mercaptans are produced by causing reaction between unsaturated hydrocarbons and hydrogen sulphide at temperatures varying from 32° F. to 100° F. by exposing a solution containing hydrocarbons, partly or wholly saturated with hydrogen sulphide, to the action of various reagents such as mineral acids or solid adsorbents such as fuller's earth, charcoal or silica gel, either of which I believe to act as catalyzers. I prefer, however, to utilizer a small volume of a solution of sulphuric acid containing from 50-93% sulphuric acid.

As a more specific example of the present process, a hydrocarbon fraction from a cracked petroleum distillate, free from mercaptans and having a boiling range from 118° to 425° F., a sulphur content of 0.24%, and a content of 42% by volume removable by treatment with sulphuric acid of 93% $H_2SO_4$, is treated in the manner above described with hydrogen sulphide and then agitated with 5% by volume of sulphuric acid containing 60% $H_2SO_4$ until the odor of hydrogen sulphide has disappeared. Successive treatments with hydrogen sulphide and acid are repeated until four treatments have been given. The sulphuric acid layer is allowed to settle after each treatment and is withdrawn or separated from the remaining liquid, and the liquid thus obtained is then washed after the fourth treatment with a 10% solution of sodium hydroxide followed by washing with water. The liquid is then distilled to remove any nonvolatile substances present and the distillate obtained is found to contain compounds which give the usual reactions for mercaptans, in that they form metallic compounds and are easily transformed into di-sulphides. The distillate contains now 3.6% sulphur, an amount corresponding to about 14% mercaptans.

The sulphur compounds produced and present in the distillate appear to be identical with those compounds recognized as present in various grades of crude petroleum and petroleum products, and known in the art of petroleum refining as "sour sulphur compounds".

For certain purposes the solution of the sulphur compounds in the hydrocarbons, produced as above described, may be used directly, or, if desired, may be concentrated or the mercaptans obtained in a purer form by fractional distillation. The solution may be utilized for the production of mercaptides, thus enabling the separation from the hydrocarbons, and the isolation of the mercaptans themselves.

The product or products of the present process may be utilized for all of the purposes for which mercaptans of corresponding purity are at present used.

While the invention is preferably applied to the process herein described, it is to be understood that it may be applied to other processes within the scope of the following claims.

Having thus described the invention, what is claimed is:—

1. In a process for producing sulphur compounds the step which comprises subjecting an unsaturated hydrocarbon to the action of hydrogen sulphide at ordinary temperatures in the presence of a mineral acid.

2. The process for producing sulphur compounds which comprises repeatedly subjecting hydrocarbon material comprised at least in part of unsaturated hydrocarbon to the action of hydrogen sulphide at ordinary temperatures in the presence of a mineral acid, separating the acid layer, neutralizing any free acid remaining in the material with alkali, and then separating the resulting sulphur compounds from the non-reacting components of the hydrocarbon.

3. The process for producing sulphur compounds which comprises repeatedly subjecting hydrocarbon material comprised at least in part of unsaturated hydrocarbons to the action of hydrogen sulphide at ordinary temperatures in the presence of sulphuric acid, separating the acid layer, neutralizing any free acid remaining in the material with alkali, and then separating the resulting sulphur compounds from the non-reacting components of the hydrocarbon.

4. The process for producing sulphur compounds which comprises effecting reaction between hydrocarbon material comprised at least in part of unsaturated hydrocarbons, and hydrogen sulphide at a temperature between 32° F. and 100° F. and in the presence of a mineral acid.

5. The process of producing mercaptans by the catalytic interaction of hydrogen sulphide and olefins.

6. The process of producing mercaptans by the catalytic interaction of hydrogen sulphide and liquid olefins.

In testimony whereof, I have hereunto subscribed my name this 17 day of June, 1926.

ERNST M. JOHANSEN.